United States Patent
Beemer et al.

(10) Patent No.: US 7,845,558 B2
(45) Date of Patent: Dec. 7, 2010

(54) ACCESSING FINANCIAL ACCOUNTS WITH 3D BAR CODE

(75) Inventors: Layne D Beemer, Blair, NE (US); Christopher L Toomer, Parker, CO (US); Steven E Arthur, Castle Rock, CO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 12/268,839

(22) Filed: Nov. 11, 2008

(65) Prior Publication Data

US 2009/0121012 A1 May 14, 2009

Related U.S. Application Data

(63) Continuation-in-part of application No. 11/864,231, filed on Sep. 28, 2007.

(51) Int. Cl.
*G06K 7/10* (2006.01)

(52) U.S. Cl. .............................. 235/462.01; 235/462.41; 455/556.1

(58) Field of Classification Search ............. 235/462.01
See application file for complete search history.

(56) References Cited

U.S. PATENT DOCUMENTS

| | | | |
|---|---|---|---|
| 6,820,802 B2 * | 11/2004 | Biggar et al. ............... 235/379 |
| 2003/0084305 A1 * | 5/2003 | Siegel et al. ................ 713/186 |
| 2004/0083170 A1 | 4/2004 | Bam et al. |
| 2005/0187873 A1 | 8/2005 | Labrou et al. |
| 2005/0203854 A1 * | 9/2005 | Das et al. ...................... 705/64 |
| 2005/0278230 A1 | 12/2005 | Shirasaka et al. |
| 2006/0155874 A1 * | 7/2006 | Hunter ....................... 709/245 |
| 2006/0259361 A1 | 11/2006 | Barhydt et al. |
| 2006/0282500 A1 * | 12/2006 | Kiuchi et al. ............... 709/203 |
| 2007/0051797 A1 * | 3/2007 | Randolph-Wall et al. ..... 235/381 |
| 2007/0159522 A1 | 7/2007 | Neven |
| 2007/0210155 A1 | 9/2007 | Swartz et al. |
| 2007/0214049 A1 | 9/2007 | Postrel |
| 2007/0281731 A1 * | 12/2007 | Attride et al. ............ 455/550.1 |
| 2007/0288886 A1 | 12/2007 | Mensch et al. |
| 2007/0291710 A1 | 12/2007 | Fadell |
| 2009/0023113 A1 * | 1/2009 | Recigno ..................... 433/223 |
| 2009/0250512 A1 * | 10/2009 | Deck et al. .................. 235/375 |

OTHER PUBLICATIONS

PCT International Search Report and Written Opinion mailed Dec. 1, 2008, International Application No. PCT/US08/77379, 10 pages.
PCT International Search Report and Written Opinion mailed Dec. 23, 2008, International Application No. PCT/US08/80777, 7 pages.

* cited by examiner

*Primary Examiner*—Daniel A Hess
*Assistant Examiner*—Keith Goodman, Jr.
(74) *Attorney, Agent, or Firm*—Townsend and Townsend and Crew LLP (57) ABSTRACT

A three dimensional (3d) bar code can be affixed to a financial instrument (e.g., the credit card) sent to a consumer. Upon receiving the financial instrument, the consumer can acquire an image of the 3D bar code with an image capture device (e.g., a camera) of a mobile device. The mobile device can interpret or decode the 3D bar code to extract a web address. The mobile device may then send a request for a web page associated with the web address, which could be returned by the web server at the financial institution. The web page may allow the consumer to enter personal information. Upon receiving the personal information, the financial institution can verify the information, authenticate the consumer, and activate the financial account.

16 Claims, 7 Drawing Sheets

ACCESSING FINANCIAL ACCOUNTS WITH 3D BAR CODE

CROSS-REFERENCES TO RELATED APPLICATIONS

This application is a Continuation-in-Part of and claims priority to U.S. application Ser. No. 11/864,231, filed on Sep. 28, 2007, entitled "SERVICE DISCOVERY VIA MOBILE IMAGING SYSTEMS AND METHODS," which is incorporated by reference herein in its entirety for any purpose. This application is also related to the following co-pending, commonly-assigned U.S. patent applications, the entirety of each of which are incorporated herein by reference for all purposes: U.S. patent application Ser. No. 11/830,409, filed on Jul. 30, 2007, entitled "MARKETING MESSAGES IN MOBILE COMMERCE"; U.S. patent application Ser. No. 11/830,336, filed on Jul. 30, 2007, entitled "MOBILE COMMUNICATION SYSTEM AND METHODS FOR REDEEMING AND REPORTING COUPONS"; and U.S. patent application Ser. No. 11/830,459, filed on Jul. 30, 2007, entitled "PAYMENTS USING A MOBILE COMMERCE DEVICE."

BACKGROUND

Credit card activation generally requires a phone interaction between the credit card recipient and the bank or other financial institution issuing the credit card. For example, a consumer calls the bank to request a credit card. The card is sent to the consumer if approved for a credit account. Generally, the credit card has a sticker affixed to the credit card requiring the consumer to call a prescribed phone number to activate the credit card.

Upon receiving the credit card, the consumer phones the number on the sticker. In some situations, the financial institution can verify that the credit card has been received by the appropriate party by comparing a phone number received when the consumer requested the credit card and a phone number retrieved from a caller identification system. However, in many situations, the consumer must repeat some or all of the personal information to the financial institution. The financial institution compares the received information with information already stored. If the information is the same, the credit account is activated and the consumer is told that he or she can use the credit card.

This process has some drawbacks. The consumer is forced to call the financial institution and resupply information already given to the financial institution. This process is time consuming and distracting for the consumer. To receive the phone calls, the financial institution must man a call center to verify the consumers and activate the accounts. The call center create a large expense for the financial institutions.

BRIEF SUMMARY

Embodiments presented herein address these and other problems. In embodiments, a 3D bar code is affixed to the financial instrument (e.g., the credit card) sent to the consumer. Upon receiving the financial instrument, the consumer can acquire an image of the 3D bar code with an image capture device (e.g., a camera) of a mobile device. The mobile device can interpret or decode the 3D bar code to extract a web address. The mobile device may then send a request for a web page associated with the web address, which could be returned by the web server at the financial institution. The web page may allow the consumer to enter personal information. Upon receiving the personal information, the financial institution can verify the information, authenticate the consumer, and activate the financial account. The financial institution can then send a message to the consumer's mobile device that the financial account associated with the financial instrument has been activated.

This summary provides only a review of some possible embodiments. The summary is not meant to limit the possible embodiments. Rather, the possible embodiments are as defined by the claims.

BRIEF DESCRIPTION OF THE DRAWINGS

The embodiments of the present disclosure are described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Embodiments of the present disclosure provide a unique and novel method and system for financial account activation. Further, the present disclosure provides embodiments of methods and systems for enabling communications between consumers and financial institutions. Embodiments include mobile devices enabled to acquire an image of a three dimensional (3d) bar code. Upon acquiring the image, the mobile device can extract a web address from the information included in the 3D bar code. In embodiments, the web address is related to a web site for a financial institution. The mobile device can then direct a web browser to request the web page from the web address. The consumer may then communicate with the financial institution associated with the web address to complete one or more actions.

An example of the method may begin with a consumer receiving a new credit card. The credit card has a 3D bar code attached. A 3D bar code may be any bar code having information recorded along a first and second axis and a plurality of colors that can also represent information. The user takes a picture of the 3D bar code using the camera of a mobile phone or other image capture device. A pattern recognition component in the mobile phone deciphers the 3D bar code. The information contained in the 3D bar code can contain a web address. The mobile phone determines that the user is directed to the web address to activate the credit card. A web browser on the mobile device requests the web page associated with the web address. The web server of the financial institution receives the request and sends the requested web page. After entering information into the web page and the financial institution authenticating the consumer, the financial account associated with the credit card is activated. This example shows the usefulness of the embodiments as call-in activation of credit cards can be eliminated. Further, the 3D bar code can provide as much information to the end consumer's mobile device without revealing that information to a person. Thus, this card activation method is more secure and private.

Figure 1:
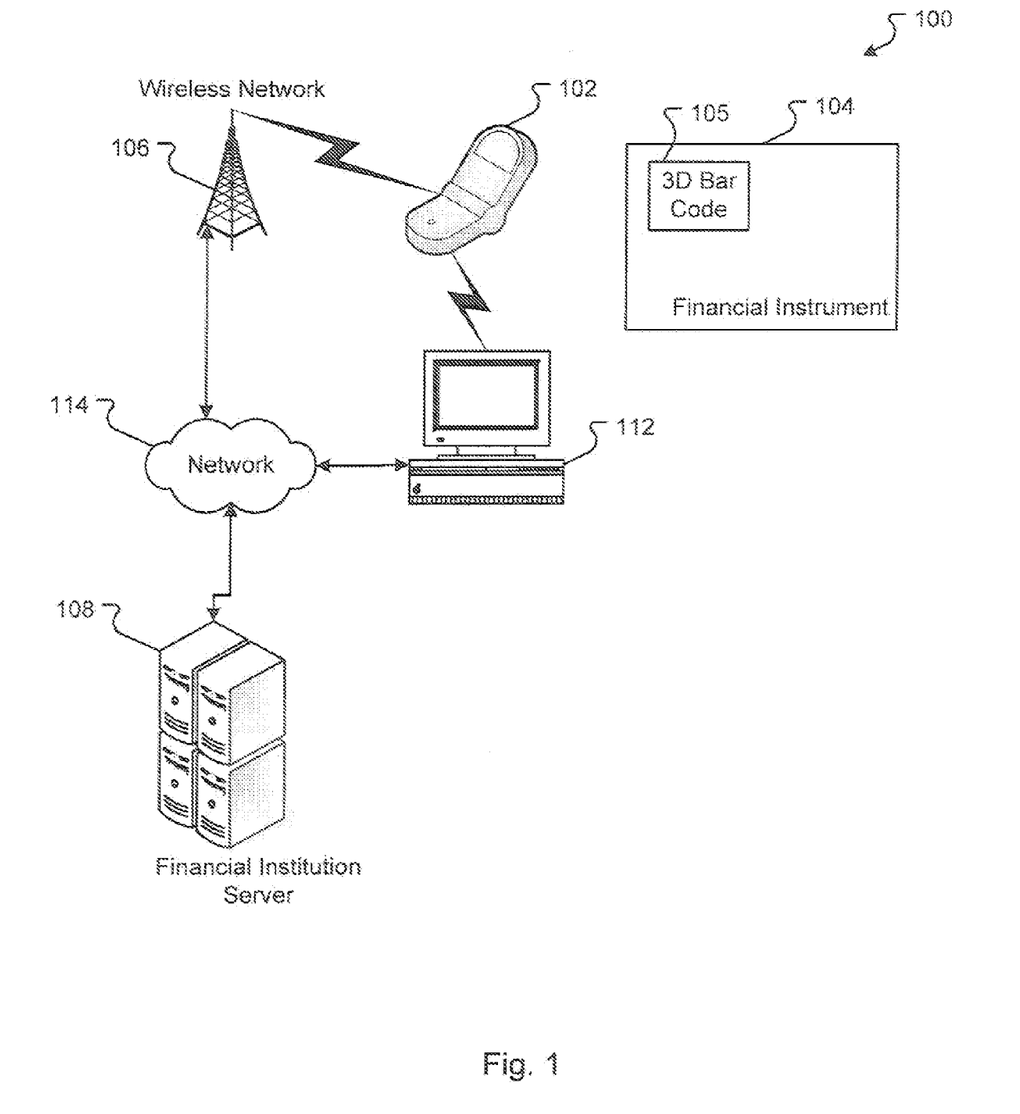
FIG. 1 is a block diagram of an embodiment of a system for activating a financial instrument using a 3D bar code.

An embodiment of a system 100 for reading and communicating 3D bar code information is shown in FIG. 1. Embodiments herein will be discussed in the context of using a mobile device to acquire information from the 3D bar code 105. However, those skilled in the art will appreciate that the system 100 is merely exemplary of a number of possible systems within which embodiments may be implemented. The system 100 includes a mobile device 102 configured to capture an image from a 3D bar code 105. The mobile device 102 may be any of a variety of image capture devices including cell phones, digital still cameras, personal digital assistants (PDAs), and the like. The captured image of the 3D bar code 105 may be from a financial instrument 104, such as a stored value card, a credit card, an account statement, or other document or instrument.

The mobile device 102 may be configured to process a captured 3D bar code 105 into useful content. The content may be embedded into the captured image (e.g., bar coding). For example, the mobile device 102 may be programmed to perform pattern recognition on the image to thereby produce the content. In some embodiments, the mobile device 102 is configured for wireless communication with a wireless communications network 106. If the device is so configured, the device may send the image through wireless communication network 106 or other networks 114 to a server 108. The server 108 may be configured to receive the image and return corresponding content. In doing so, the server may perform pattern recognition or may match the image to a stored image to thereby identify the corresponding content. The content may be returned to the mobile device via the wireless network 106.

The mobile device 102 also may be configured to transmit the image or the corresponding content to another device 112. For example, the mobile device 102 may transmit content to a computing device 112 capable of communicating the content through the network 114 to the server 108. Similar technology is described more fully in, for example, previously incorporated U.S. patent application Ser. No. 11/830,409 and/or previously-incorporated U.S. patent Ser. No. 11/830,336.

Figure 2:
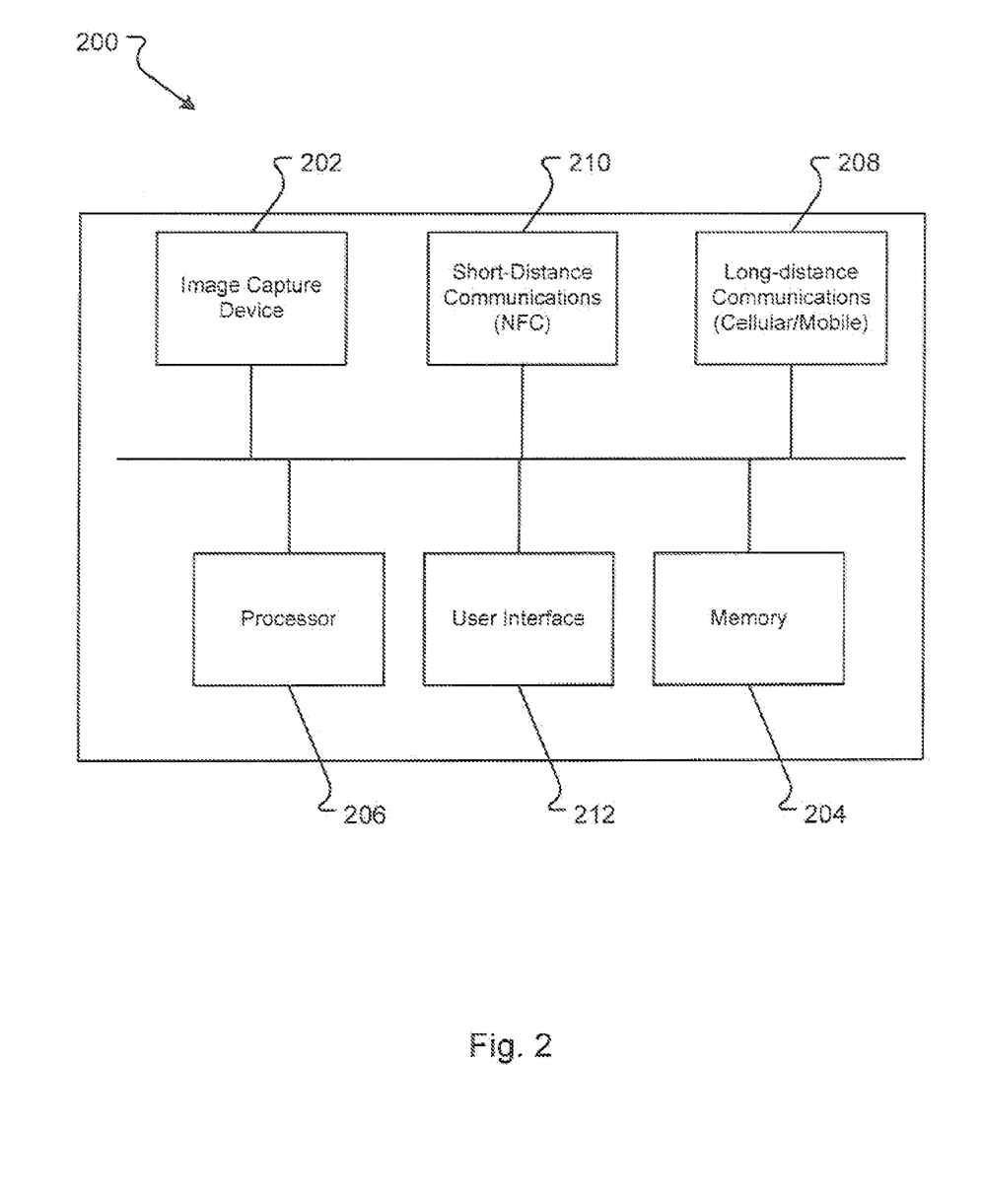
FIG. 2 is a block diagram of an embodiment of a mobile device for activating a financial instrument using a 3D bar code.

An embodiment of a mobile device 200, similar to or the same as mobile device 102 (FIG. 1) is shown in FIG. 2. The mobile device 200 can include one or more of, but is not limited to, an image capture component 202, a processor 206, a memory 204, a long, range wireless transceiver 208 (e.g. cellular transceiver), a short range wireless transceiver 210 (e.g., near field communication (NFC) device), and/or an output device 212 (e.g. display). Each of the image capture component 202, the processor 206, the memory 204, the long range wireless transceiver 206, the short range wireless transceiver 210, and/or the user interface device(s) 212 may be hardware, software, or a combination of hardware and software. The image capture component 202 can be a camera, scanner, or other device for capturing an image. In use, the mobile device 200 may capture a 3D bar code 105 (FIG. 1) image using the image capture component 202, process the image into content using the processor 206, store the image and/or the content in memory 204, transmit the image or the content over a network using the long range wireless transceiver 208, and/or transmit the image or content over a short distance to another computing device using the short range wireless transceiver 210. In embodiments, received content may be displayed by and inputs from the user received by the user interface device(s) 212.

Figure 3:
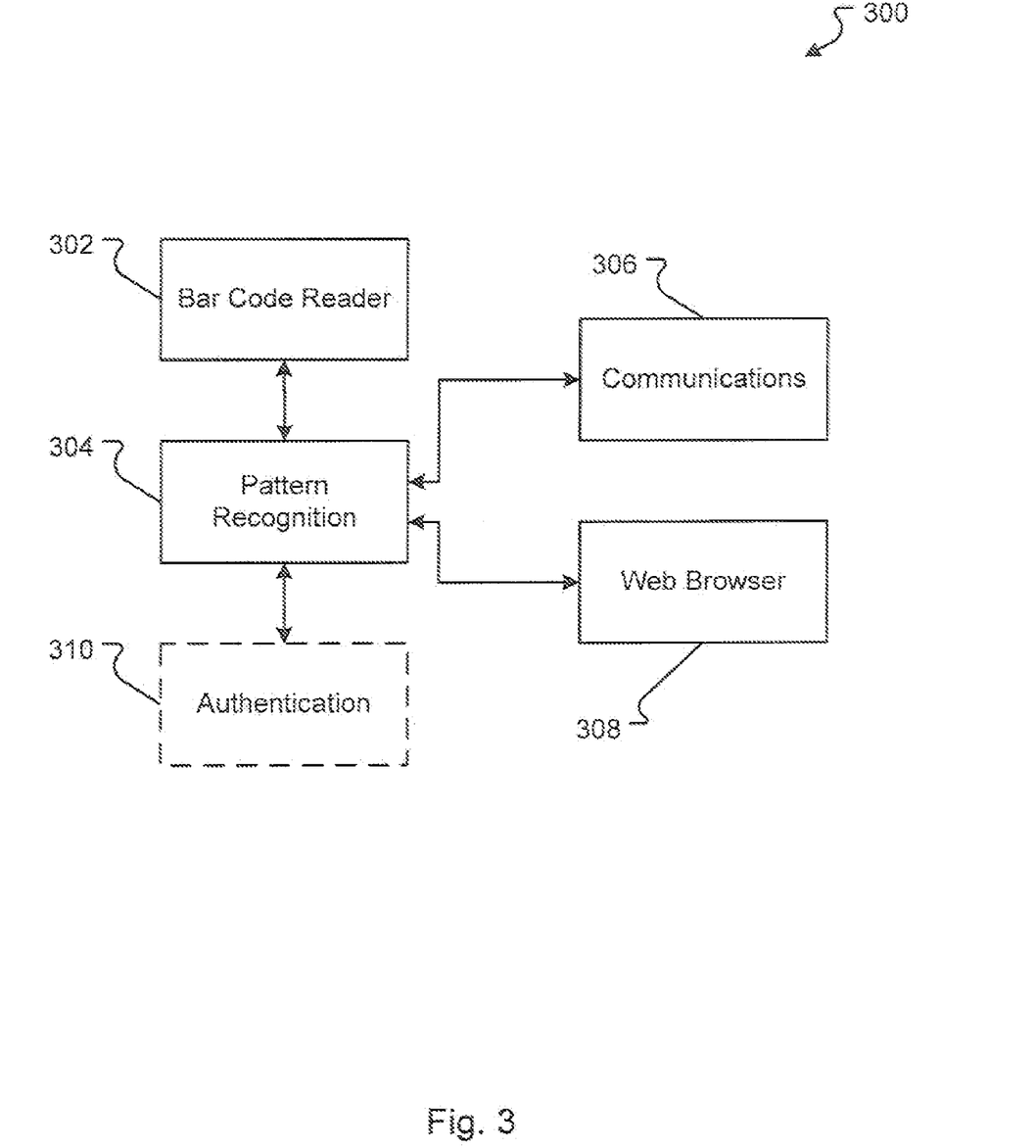
FIG. 3 is a block diagram of an embodiment of software component executable by a mobile device for activating a financial instrument using a 3D bar code.

An embodiment of one or more software components, modules, or code 300 stored in the memory 204 (FIG. 2) and executable in the processor 206 (FIG. 2) of the mobile device 200 (FIG. 2) is shown in FIG. 3. The software components 300 can include one or more of, but is not limited to, a 3D bar code reader 302, a pattern recognition component 304, a communication component 306, a web browser component 308, and/or an authentication component 310. The 3D bar code reader 302 can extract the 3D bar code 105 (FIG. 1) from the image provided by the image capture component 202 (FIG. 2). The pattern recognition component 304 may receive the 3D bar code 105 (FIG. 1) from the 3D bar code reader 302 and determine the information or content encoded within the 3D bar code 105 (FIG. 1). For example, the pattern recognition component 304 can determine the information contained in the first and second axis patterns and determine the information contained in the coloration of the bar code. The content extracted from the 3D bar code 105 (FIG. 1) can include a uniform resource location (URL) or web address for a financial institution. The communication component 306 can format data for transmission with the short range wireless transceiver 210 (FIG. 2) or the long range wireless transceiver 208 (FIG. 2). Further, the communications component can read information received from the long range wireless transceiver 208 (FIG. 2) or the short range wireless transceiver 210 (FIG. 2). The web browser component 308 can render web pages for display on a user interface device(s) 212 (FIG. 2) or receive inputs from the user into a web page entered into a user interface device(s) 212 (FIG. 2).

The authentication component 310 may be optional. The authentication component 310 can determine if the user of the mobile device 200 (FIG. 2) is the proper recipient of the instrument bearing the 3D bar code 105 (FIG. 1). In embodiments, the 3D bar code 105 (FIG. 1) contains information about the consumer who previously ordered the financial instrument (e.g., credit card). For example, the consumer's mobile device number and name are encoded into the 3D bar code 105 (FIG. 1). The authentication component 310 can retrieve information stored in memory 204 (FIG. 2) and compare the information extracted from the 3D bar code 105 (FIG. 1). If the information matches, the consumer may be authenticated and allowed to proceed with the transaction. The authentication of the user adds security to the transaction.

Figure 4:
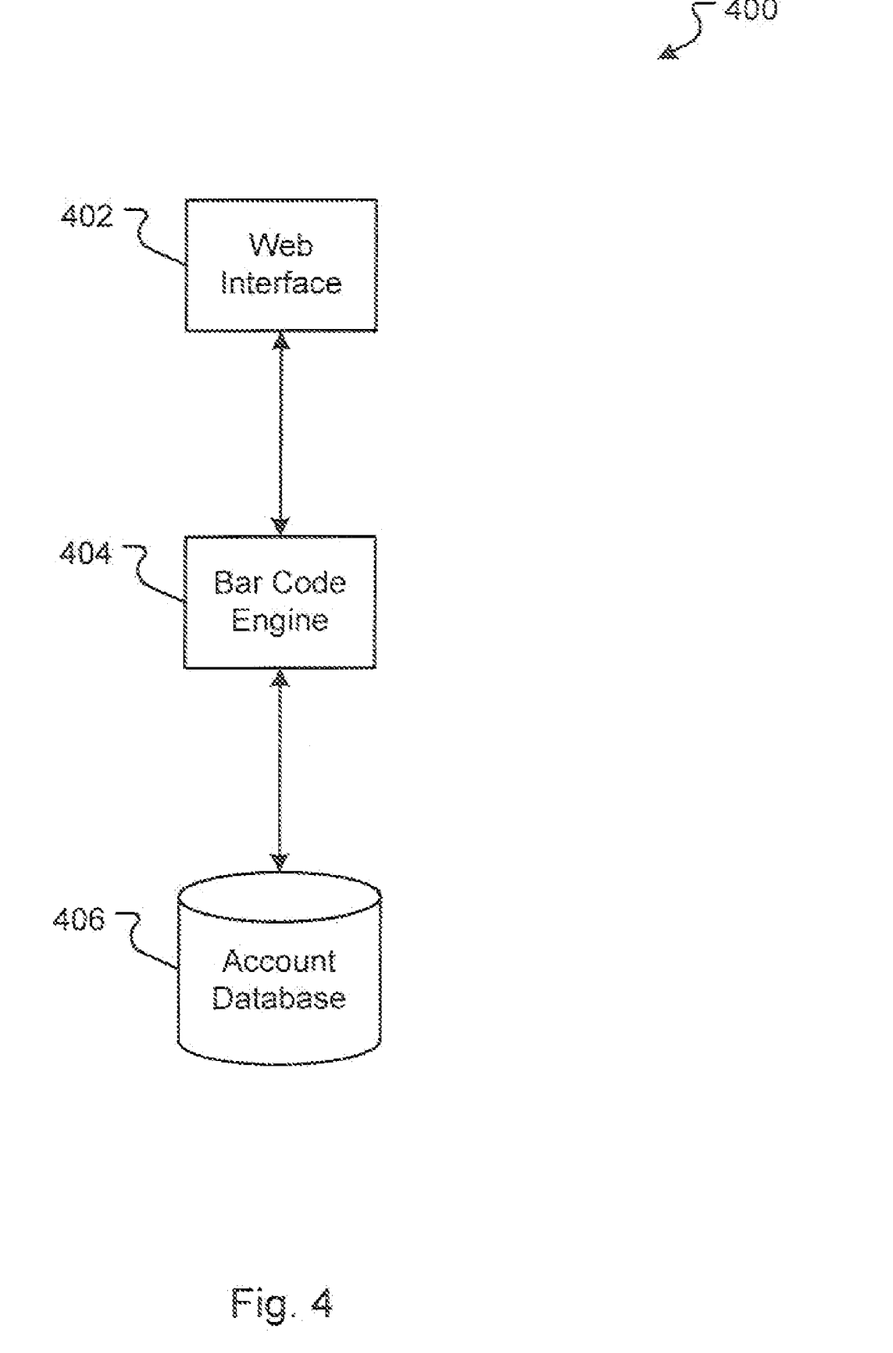
FIG. 4 is a block diagram of an embodiment of a financial institution's web server for activating a financial instrument using a 3D bar code.

An embodiment of one or more software components of a server 400, similar to or the same as server 108 (FIG. 1), is shown in FIG. 4. The server software components 400 can include one or more of, but are not limited to, a web interface 402, a bar code engine 404, and/or a financial account database 406. The web interface 402 can receive web page requests from the mobile device 102 (FIG. 1) and send web page data to the mobile device 102 (FIG. 1) for rendering.

The bar code engine 404 may verify the bar code data sent from the mobile device 102 (FIG. 1). Further, the bar code engine 404 can retrieve information from the financial account database 406 associated with the received bar code data. This retrieved information can include the consumer's name, address, phone number, social security number, etc. One or more items of this information can be input into a web page to send to the mobile device 102 (FIG. 1). In other embodiments, information about the customer is requested in a web page sent to the mobile device 102 (FIG. 1). The received information from the consumer is compared to the information retrieved from the financial account database 406 and associated with the 3D bar code 105 (FIG. 1). If the information is the same, the bar code engine 404 authenticates the consumer and approves the transaction. The transaction can be an activation of a financial account associated with a credit card.

Figure 5:
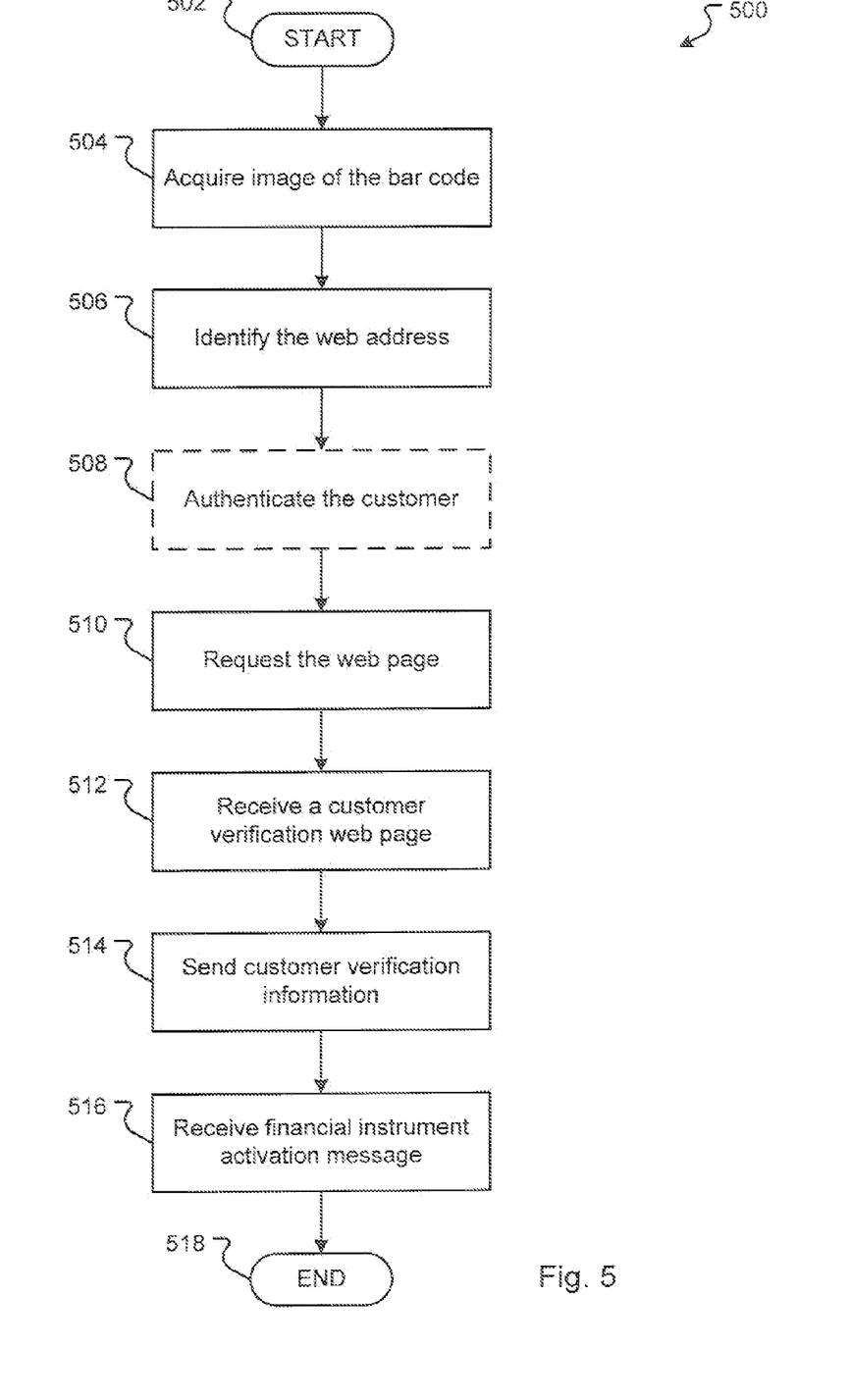
FIG. 5 is a flow diagram of an embodiment of a method for activating a financial instrument using a 3D bar code with a mobile device.

An embodiment of a method 500 for activating a financial card (e.g., a credit card, stored value card, etc.) using a 3D bar code 105 (FIG. 1) is shown in FIG. 5. In embodiments, the method 500 generally begins with a START operation 502 and terminates with an END operation 518. The steps shown in the method 500 may be executed in a mobile device 102 (FIG. 1) as a set of computer executable instructions. While a logical order is shown in FIG. 5, the steps shown or described can, in some circumstances, be executed in a different order than presented herein.

In embodiments, the consumer receives a financial instrument (e.g., a credit card) having a 3D bar code 105 (FIG. 1) imprinted or affixed thereon. An image capture device 202 (FIG. 2) of a mobile device 102 (FIG. 1) can acquire an image of the 3D bar code 105 (FIG. 1) in step 504. The consumer can have software downloaded to the mobile device 102 (FIG. 1). A bar code reader software 302 (FIG. 3) may determine the 3D bar code 105 (FIG. 1) from the image and extract just the 3D bar code 105 (FIG. 1). The software can include a pattern recognition component 304 (FIG. 3) for reading the 3D bar code 105 (FIG. 1) information. The information encoded in the 3D bar code 105 (FIG. 1) can be read to identify a web address for the financial institution that sent the financial instrument in step 506. Optionally, one or more portions of the 3D bar code information is compared to information stored in a memory 204 (FIG. 2) of the mobile device 102 (FIG. 1). For example, the consumer's name, address, and/or mobile phone number are compared. If the information compares, the consumer is authenticated by the authentication component 310 (FIG. 3) of the mobile device 102 (FIG. 1) in step 508.

The web address extracted from the 3D bar code information is sent to a web browser component 308 (FIG. 3). The web browser component 308 (FIG. 3) requests the web page associated with the web address in step 510. The web browser 308 (FIG. 3) can send the request to the communication component 306 (FIG. 3) to send either through an NFC component 210 (FIG. 2) or a long range wireless component 208 (FIG. 2). In response to the web page request from the URL or web address extracted from the 3D bar code information, a customer verification web page is received at the communications component 306 (FIG. 3) in step 512. The web page data is rendered by the web browser and provided to the consumer on the user interface 212 (FIG. 2) of the mobile device 102 (FIG. 1).

Then, the consumer can enter personal information (e.g., name, address, phone number, etc.) into the web page using the user interface 212 (FIG. 2). The entered information is sent by the communication component 306 (FIG. 3) back to the URL as a reply to the received web page in step 514. If the information compares and the consumer is authenticated, the financial account associated with the financial instrument is activated. If the information does not compare, a message is received that the customer is not authenticated. The mobile device 102 can display the non-activation message. The mobile device 102 (FIG. 1) can then receive an activation message acknowledging that the consumer can now use the financial instrument in step 516. The communications component 306 (FIG. 3) can receive the message, and the web browser 308 (FIG. 3) may render the message for display on the user interface 212 (FIG. 2).

Figure 6:
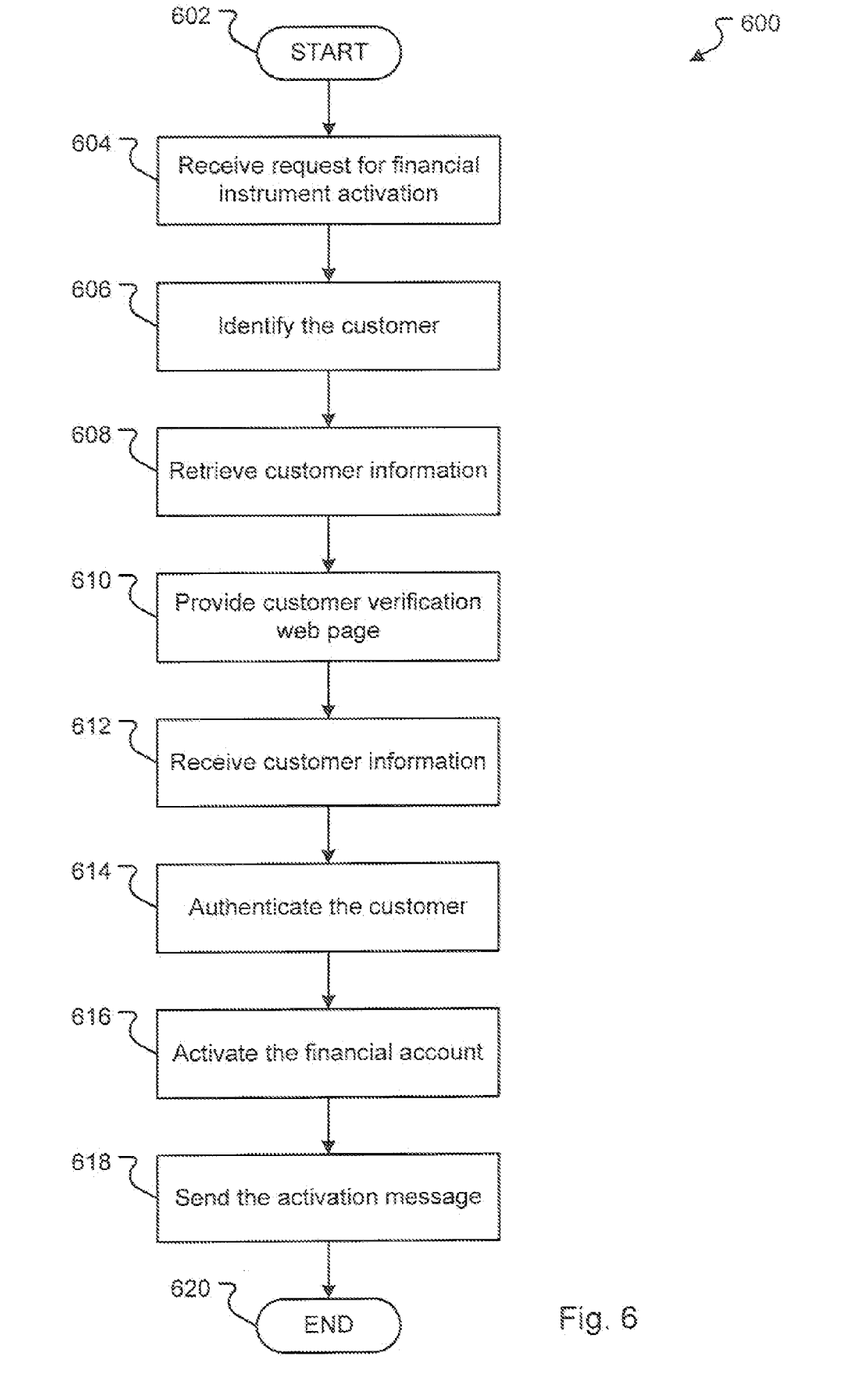
FIG. 6 is a flow diagram of an embodiment of a method for activating a financial instrument using a 3D bar code with a financial institution's web server.

An embodiment of a method 600 for activating a financial card (e.g., a credit card, stored value card, etc.) using a 3D bar code 105 (FIG. 1) is shown in FIG. 6. In embodiments, the method 600 generally begins with a START operation 602 and terminates with an END operation 620. The steps shown in the method 600 may be executed in a financial institution server 108 (FIG. 1) as a set of computer executable instructions. While a logical order is shown in FIG. 6, the steps shown or described can, in some circumstances, be executed in a different order than presented herein.

In embodiments, the financial institution server 108 (FIG. 1), at a web interface 402 (FIG. 4), receives a request for a web page in step 604. The requested web page may be associated with a single consumer's financial account. In other embodiments, the request is for an account activation web page, and the request includes information about the consumer (e.g., name, address, phone number. etc.) or the financial account (e.g., account number, account expiration date, etc.). The information encoded in the 3D bar code 105 (FIG. 1) can be sent to identify the customer and/or the financial account. The financial institution server 108 (FIG. 1) includes a bar code engine 404 (FIG. 4) that identifies the customer sending the request in step 606. The identification may be completed by extracting information from the web page request. In other embodiments, the bar code engine 404 (FIG. 4) retrieves information from an account database 406 (FIG. 4) to identify the customer. For example, the account database 406 (FIG. 4) includes information about the customer that requested the financial instrument with the account number received in the web page request. The bar code engine 406 (FIG. 4) can read the customer's information from the information associated with the account number in the account database 406 (FIG. 4).

The bar code engine 404 (FIG. 4) can then retrieve customer information from the account database 406 (FIG. 4) in step 608. Optionally, the information required for authentication is already present in the account database 406 (FIG. 4). For example, the web page request is particular to each customer. In other words, a first customer requests a first web page specific to the first financial account, and a second customer requests a second web page specific to a second web page. The information for the particular web pages is static or linked to particular information in the account database 406 (FIG. 4). Thus, the bar code engine 404 (FIG. 4) can proceed to authentication in step 614 by comparing the received account number with the account number in the specific web page.

The bar code engine 404 (FIG. 4) may also pre-populate a web page with one or more portions of the customer data to send to the mobile device 102 (FIG. 1) as a customer verification page. The web interface 402 (FIG. 4) formats the web page transmission and sends the verification page to the customer in step 610. The web page data is rendered by the web browser and provided to the consumer on the user interface 212 (FIG. 2) of the mobile device 102 (FIG. 1). Then, the consumer can enter personal information (e.g., name, address, phone number, etc.) into the web page using the user interface 212 (FIG. 2). The entered information is sent by the communication component 306 (FIG. 3) back to the URL as a reply to the received web page. The web interface 402 (FIG. 4) receives the customer information in the reply in step 612.

One or more portions of the 3D bar code information is compared to information stored in the account database 406 (FIG. 4) to authenticate the customer in step 614. For example, the consumer's name, address, and/or mobile phone number are compared. If the information compares, the consumer is authenticated by the bar code engine 404 (FIG. 4). The bar code engine 404 (FIG. 4) can then activate the financial account associated with the financial instrument in step 616. In other embodiments, the bar code engine 404 (FIG. 4) may send a message to another financial server component to activate the account. The bar code engine 404 (FIG. 4) then generates an activation verification message and sends the message to the web interface 402 (FIG. 4). The web interface 402 (FIG. 4) creates a activation verification message and sends the message to the mobile device 102 (FIG. 1) in step 618.

Figure 7:
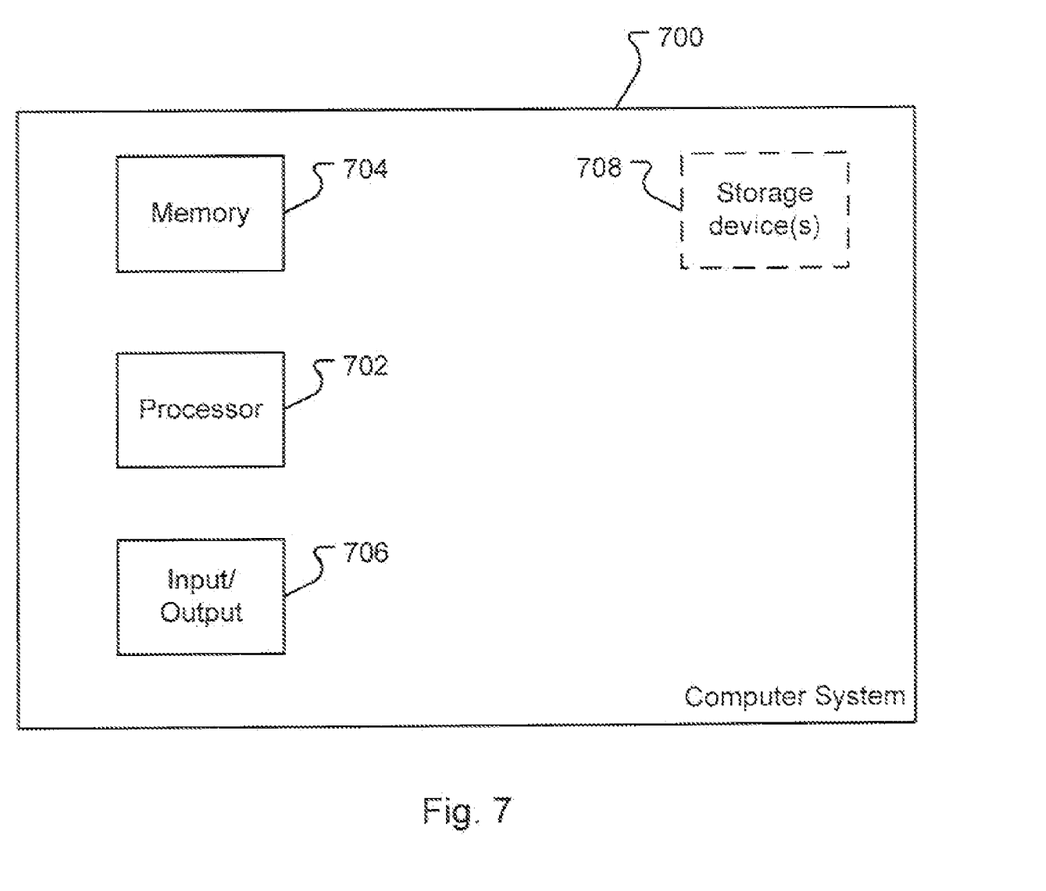
FIG. 7 is a block diagram of an embodiment of computing system as operable to perform as one or more components or execute one or more methods described herein.

An embodiment of a computing system 700 operable to perform as one or more components or in one or more systems as described herein is shown in FIG. 7. The computer system 700 can also comprise a processor 702 that can execute software elements, located within the working memory 704, including an operating system and/or other code, such as one or more application programs that may execute similar or the same as the methods in FIGS. 5 and 6, which may comprise computer programs of the disclosure, and/or may be designed to implement methods of the disclosure and/or configure systems of the disclosure, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 708 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code. System 700 can also include input and output devices 706. Input devices can include cameras, microphones, keyboards, mouse, etc. Output devices can include displays (e.g., LCD monitors), speakers, printers, etc.

A number of variations and modifications of the disclosure can also be used. For example, the 3D bar code 105 (FIG. 1) can be associated with the financial account for all transactions. As such, the 3D bar code 105 (FIG. 1) can be printed or affixed to communications to the customer. For example, the 3D bar code 105 (FIG. 1) can be printed on a customer's bill. The customer can then acquire an image of the 3D bar code 105 (FIG. 1) and extract the web address from the 3D bar code 105 (FIG. 1). By requesting a web page from the web address, the customer can interface with the financial server to pay bills, request services, or complete other actions. The use of the 3D bar code 105 (FIG. 1) and the web interface, the financial institution can provide enhanced services and eliminate the need for call center services.

The preceding description provides exemplary embodiment(s) only, and is not intended to limit the scope, applicability or configuration of the disclosure. Rather, the description of the exemplary embodiment(s) will provide those skilled in the art with an enabling description for implementing a exemplary embodiment of the disclosure. It is to be understood that various changes may be made in the function and arrangement of elements without departing from the spirit and scope of the disclosure as set forth in the appended claims.

Specific details are given in the description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments that perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the principles of the disclosure have been described above in connection with specific apparatuses and methods, it is to be clearly understood that this description is made only by way of example and not as limitation on the scope of the disclosure.

What is claimed is:

1. A method for completing a transaction between a customer and a financial institution with a mobile device, the method comprising:
   acquiring an image of a 3D (three dimensional) bar code, the 3D bar code affixed to a financial instrument sent by the financial institution to the customer;
   identifying data encoded in the image of the 3D bar code, the data associated with a web address;
   authenticating the customer at the mobile device;
   wherein authenticating the customer comprises:
      comparing information encoded in the 3D bar code with information stored in memory of the mobile device, wherein the information includes personal information associated with the customer;
      when the information compares, authenticating the customer; and
      when the information does not compare, displaying a message that the customer is not authenticated;
   requesting a web page from the web address;
   in response to the request for the web page, receiving a customer verification web page;
   sending customer information entered into the customer verification web page to the web address;
   receiving an activation message for the financial instrument, wherein the activation message is received if the customer information is authenticated; and
   displaying the activation message to the customer.

2. The method as defined in claim 1, wherein the customer verification web page includes an item of personal information for the customer already included in the customer verification web page.

3. The method as defined in claim 1, wherein the financial instrument includes one of a credit card, a stored value card, or a financial account statement.

4. The method as defined in claim 1, wherein the 3D bar code includes encoded information in a first axis, a second axis, and in the coloring of the 3D bar code.

5. A mobile device operable to complete a transaction between a customer and a financial institution to activate a financial instrument, the mobile device comprising:
   an image capture device, the image capture device operable to capture an image of a 3D bar code affixed to the financial instrument;
   a long-range communications component, the long-range communications component operable to communicate with a financial server associated with the financial institution;
   a memory operable to store computer executable code;
   a user interface operable to display information to the customer and receive inputs from the customer;
   a processor in communication with the image capture device, the memory, and the long-range communications component, the processor operable to receive the image from the image capture device, to send data to the long-range communications component for sending to the financial server, to receive data from the long-range communications component received from the financial server, and to execute computer executable code stored in the memory, the computer executable code including:
   instructions for identifying data encoded in the image of the 3D bar code, the data associated with a web address;
   instructions for requesting a web page from the web address, the request being sent to the long-range communications component to send to the financial server;
   in response to the request for the web page, instructions for receiving a customer verification web page, the customer verification web page received from the long-range communications component;
   instructions for sending customer information entered into the customer verification web page to the web address, the customer information being received from the user interface and being sent to the long-range communications component to send to the financial server; and
   instructions for receiving an activation message for the financial instrument, wherein the activation message is received if the customer information is authenticated, the activation message received from the long-range communications component;
   instructions for displaying the activation message to the customer on the user interface;
   a bar code reader component, the bar code reader component executable to extract the 3D bar code from the image sent from the image capture device;
   a pattern recognition component, the pattern recognition component operable to read encoded information in the 3D bar code, the encoded information including the web address;
   a web browser, the web browser executable to render the customer verification web page and the activation message; and
   an authentication component executable to compare information encoded in the 3D bar code with information stored in the memory, wherein the information includes personal information associated with the customer, when the information compares, authenticating the customer, and when the information does not compare, providing a message to the user interface that the customer is not authenticated.

6. The mobile device as defined in claim 5, wherein the mobile device stores one or more items of personal information associated with the customer.

7. The mobile device as defined in claim 6, wherein the customer information sent to the financial server includes an item of personal information stored in the memory.

8. The mobile device as defined in claim 5, wherein the web browser accepts personal information entered by the customer using the user interface.

9. The mobile device as defined in claim 5, the financial server comprising:
   a web interface, the web interface executable to receive requests for customer verification web pages and to send the customer verification web page and the activation message to the mobile device;

an account database, the account database storing information associated with the customer and a financial account associated with the financial instrument;

a bar code engine in communication with the web interface and the account database, the bar code engine executing executable code, the executable code comprising:

instructions for receiving a request for a customer verification web page from the mobile device at the web interface, the request including information associated with a 3D bar code, the 3D bar code associated with the financial account having the financial instrument;

instructions for identifying the customer associated with the 3D bar code;

instructions for retrieving customer information associated with the customer from the account database;

instructions for providing the customer verification web page to the mobile device with the web interface;

in response to providing the customer verification web page, instructions for receiving customer information at the web interface;

instructions for authenticating the customer;

if the customer is authenticated, instructions for activating the financial account associated with the 3D bar code;

instructions for sending an activation message to the mobile device with the web interface; and if the customer is not authenticated, instructions for sending a message to the mobile device with the web interface that the customer is not authenticated.

10. The mobile device as defined in claim 9, wherein the instructions for authenticating the customer comprises:

instructions for comparing information received, with the request, with information, stored in the account database, wherein the information includes personal information associated with the customer;

when the information compares, instructions for authenticating the customer; and when the information does not compare, instructions for sending a non-authentication message with the web interface.

11. The mobile device as defined in claim 9, further comprising instructions to send a message to the mobile device with the web interface that the financial account is not activated when the customer is not authenticated.

12. The mobile device as defined in claim 9, further comprising instructions for pre-populating the customer verification web page before sending the customer verification web page.

13. A method for completing a transaction between a customer and a financial institution with a financial server, the method comprising:

receiving a request for a customer verification web page from a mobile device, the request including information associated with a 3D bar code, the 3D bar code associated with a financial account having a financial instrument;

identifying the customer associated with the 3D bar code;

retrieving customer information associated with the customer from an account database using the information associated with the 3D bar code;

after retrieving the customer information providing the customer verification web page to the mobile device to solicit input from the customer to authenticate the customer;

in response to providing the customer verification web page, receiving customer information;

authenticating the customer;

if the customer is authenticated, activating the financial account associated with the 3D bar code;

sending an activation message to the mobile device; and if the customer is not authenticated, sending a message to the mobile device that the customer is not authenticated.

14. The method as defined in claim 13, wherein authenticating the customer comprises:

comparing information, received with the request, with information, stored in the account database, wherein the information includes personal information associated with the customer;

when the information compares, authenticating the customer; and when the information does not compare, sending a non-authentication message.

15. The method as defined in claim 13, if the customer is not authenticated, sending a message to the mobile device that the financial account is not activated.

16. The method as defined in claim 13, further comprising pre-populating the customer verification web page before sending the customer verification web page.

* * * * *